(12) United States Patent
Knudsen et al.

(10) Patent No.: US 11,396,932 B2
(45) Date of Patent: Jul. 26, 2022

(54) LINEAR ACTUATOR

(71) Applicant: LINAK A/S, Nordborg (DK)

(72) Inventors: Martin Kahr Knudsen, Sydals (DK); Henrik Skovby, Sydals (DK); René Sørensen, Gråsten (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 16/626,432

(22) PCT Filed: Jun. 28, 2018

(86) PCT No.: PCT/DK2018/000031
§ 371 (c)(1),
(2) Date: Dec. 24, 2019

(87) PCT Pub. No.: WO2019/001655
PCT Pub. Date: Jan. 3, 2019

(65) Prior Publication Data
US 2020/0132175 A1    Apr. 30, 2020

(30) Foreign Application Priority Data
Jun. 28, 2017 (DK) .......................... PA 2017 00387

(51) Int. Cl.
*F16H 25/20*    (2006.01)
(52) U.S. Cl.
CPC ..... *F16H 25/20* (2013.01); *F16H 2025/2037* (2013.01); *F16H 2025/2084* (2013.01)

(58) Field of Classification Search
CPC .... F16H 25/20; F16H 2025/2037; F16B 2/20; F16B 2/22; F16B 2/205; F16B 2/24;
(Continued)

(56) References Cited

U.S. PATENT DOCUMENTS 2,166,916 A * 7/1939 Lombard ................ F16B 2/245
248/73
2,795,834 A * 6/1957 Szoke .................... A47G 29/08
248/113
(Continued)

FOREIGN PATENT DOCUMENTS

DE    102005033629 A1    2/2006
DE    102012105717 A1    1/2014
(Continued)

*Primary Examiner* — Jake Cook
*Assistant Examiner* — Gregory Robert Weber
(74) *Attorney, Agent, or Firm* — Dykema Gossett PLLC

(57) ABSTRACT

A linear actuator is described comprising an actuator housing, a driven element moveable at a front end of the linear actuator and a mounting (4) at a rear end of the linear actuator, wherein the mounting (4) comprises two arms (9,10) and an accommodation space (11) between the two arms (9,10). The object underlying the invention is to provide a linear actuator which can easily be mounted with its rear mounting. To this end, at least one arm (9,10) is provided with a lever (12,13) which is rotatable about an axis between an open position and a closed position, wherein in the closed position, an end portion (14,16) of the lever (12,13) at least partly closes an opening (18) between the two arms (9,10) and in the open position makes the opening (18) accessible.

13 Claims, 4 Drawing Sheets

(58) Field of Classification Search
CPC .......... F16B 2/241; F16B 2/243; F16B 2/246;
F16B 2/248; F16B 2/245; A61G 7/018;
A47C 20/042
See application file for complete search history.

(56) References Cited

U.S. PATENT DOCUMENTS

| | | | | |
|---|---|---|---|---|
| 3,216,685 | A * | 11/1965 | Raymond | H02G 3/32 |
| | | | | 248/74.2 |
| 7,900,302 | B2 * | 3/2011 | Long | A47C 20/08 |
| | | | | 5/618 |
| 9,408,466 | B2 * | 8/2016 | Flamme | A47C 1/03211 |
| 10,590,968 | B2 * | 3/2020 | Benedetti | B60R 13/0206 |
| 2015/0320215 | A1 | 11/2015 | Flamme | |
| 2016/0040765 | A1 * | 2/2016 | Jiang | F16H 25/20 |
| | | | | 74/89.23 |
| 2016/0345736 | A1 | 12/2016 | Flamme | |

FOREIGN PATENT DOCUMENTS

| | | | |
|---|---|---|---|
| EP | 0 860 126 A1 | 8/1998 | |
| EP | 2 975 297 A2 | 1/2016 | |
| GB | 1031573 A * | 6/1966 | ............. F16B 21/20 |
| WO | WO-0063599 A1 * | 10/2000 | ............ F16L 3/1008 |

\* cited by examiner

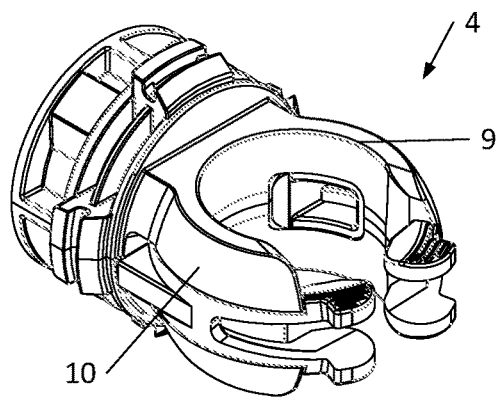
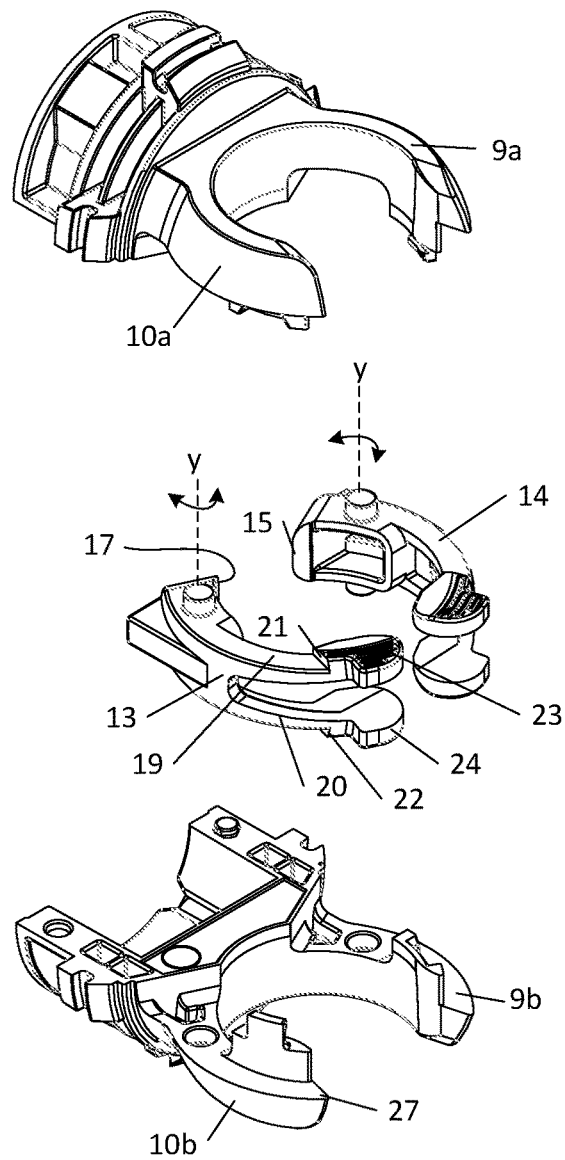
Fig. 8
Fig. 9

LINEAR ACTUATOR

CROSS-REFERENCE TO RELATED APPLICATIONS

This application is a national stage filing based upon international application no. PCT/DK2018/000031, filed 28 Jun. 2018 (the '031 application), and published in English on 3 Jan. 2019 under international publication no. WO 2019/001655 A1, which claims priority to Denmark (DK) patent application no. PA 2017 00387, filed 28 Jun. 2017 (the '387 application). The '031 application and the '387 application are both hereby incorporated by reference as though fully set forth herein.

The present invention relates to a linear actuator comprising an actuator housing, a driven element moveable in and out of a front end of the linear actuator and a mounting at a rear end of the linear actuator, wherein the mounting comprises two arms and an accommodation space between the two arms.

Such a linear actuator is known, for example, from EP 2 975 297 A2. The mounting is used to connect the linear actuator to an element which should be moved relative to another element by means of the linear actuator.

A widespread application of such a linear actuator is for use in a bed. When the linear actuator is activated, it adjusts e.g. a back rest section or a leg rest section of the bed.

The mounting at the rear end of the linear actuator, also known as "rear mounting", is connected to a section of a bed via a shaft. Furthermore, the driven element at the front end of the linear actuator is connected to another element of the bed.

In the linear actuator known from EP 2 975 297 A2, the arms of the mounting are flexible, and the shaft of the bed is pushed into the accommodation space through an opening. When the shaft passes the opening, the arms are moved away from each other. When such a clip connection is not sufficient, a spring lock can additionally be mounted to connect the two arms and keep the opening closed.

However, the use of such a spring lock requires an additional component and additional steps when mounting the rear mounting onto a shaft of a section of the bed.

The object underlying the invention is to provide a linear actuator which can easily be mounted with its rear mounting.

This object is solved with a linear actuator according to the preamble of claim 1, where at least one arm is provided with a lever which is rotatable about an axis between an open position and a closed position, wherein in the closed position an end portion of the lever at least partly closes an opening between the two arms and in the open position makes the opening accessible.

In this rear mounting, the lever is used for closing the opening so that a shaft, which has been inserted into the accommodation space, cannot be disengaged from the accommodating space without operating the lever.

In an embodiment of the invention, the lever is a two-arm lever with its end portion located at a first end and its actuation portion located at a second end, wherein in the open position the actuating portion protrudes into the accommodation space. When a shaft is pushed into the accommodation space, the shaft comes into contact with the second end of the lever and upon movement rotates the lever about the axis. At the same time, the first end of the lever closes the opening of the accommodation space and the shaft is held in the accommodation space. Hence, the rotation or tilting of the lever automatically takes place when the shaft is pushed into the accommodation space.

In an embodiment of the invention, the lever is secured in the closed position by means of a snap connection, more precisely a releasable snap connection. The snap connection has the technical effect that the lever can be turned in one direction until it reaches a locked position, however, it cannot be turned back. When the snap connection is released, and the lever turned, it is possible to disengage the shaft from the accommodation space.

In an embodiment of the invention, the snap connection comprises a wedge arrangement at the lever, and a stop arrangement at the arm, wherein engagement of the wedge arrangement and the stop arrangement prevents rotation or turning of the lever about the axis. In a further embodiment, the wedge arrangement and the stop arrangement are moveable relative to each other in a direction perpendicular to the longitudinal axis of the inner tube of the linear actuator. When the lever is moved from the open position into the closed position, a wedge of the wedge arrangement can pass a stop of the stop arrangement. During this movement, the wedge is moved slightly in a direction perpendicular to the longitudinal axis of the inner tube. When the wedge has passed the stop, it flexes back into the initial position. A face at the rear side the wedge can engage with a corresponding face of the stop, so that the lever cannot be moved. The snap connection can therefore not be released by forces acting on the shaft in a direction out of the accommodation space.

In an embodiment of the invention, the wedge arrangement is located on a resilient part of the lever. The resilient part allows for a slight movement of the wedge arrangement in a direction parallel to the axis of the lever.

In an embodiment of the invention, the wedge arrangement comprises at least two wedges, each wedge being arranged on a resilient branch of the lever, wherein the resilient branches can be pressed together to move the wedges out of engagement with the stop arrangement. By pressing the two resilient branches of the lever together, the snap connection can be released. The pressing together of the two resilient branches can be achieved by using two fingers. In this embodiment, it is preferred that the resilient branches comprise grip portions protruding from the lever in a direction away from the accommodation space. These grip portions can be actuated by using two fingers.

In an embodiment of the invention, the mounting comprises a fixture housing, wherein the fixture housing comprises two housing parts and the lever is mounted between the two housing parts. The housing parts can be identical. The housing parts can be assembled, for example, by means of a snap or clip connection.

In an embodiment of the invention, each arm comprises a lever. The two levers can be rotated in opposite directions to close the opening.

In an embodiment of the invention, in the closed position, at least in a region of the accommodation space facing the opening, the lever extends into the accommodation space. When a shaft is inserted into the accommodation space, at least in the region of the accommodation space facing the opening, the shaft rests against the lever and not against the arm. The lever cannot rotate. Therefore, this is a security feature holding the shaft firmly in the accommodation space.

In an embodiment of the invention, the lever, at least at a surface facing the accommodation space, is made from a material having a lower friction coefficient than the material of the arm. When the shaft only rests against the lever, the contact surface between the shaft and the lever shows a low friction, whereby noise generation during movement of the linear actuator relative to the shaft can be avoided or kept small.

In an embodiment of the invention, the surface of the arm facing the accommodation space has a lower friction coefficient than the lever at least at a surface facing the accommodation space. When the shaft only rests against the arm, the contact surface between the shaft and the arm shows a low friction, whereby noise generation during movement of the linear actuator relative to the shaft can be avoided or kept small.

A preferred embodiment of the invention will now be described in more detail with reference to the drawing, wherein:

FIG. 8 is a perspective view of the mounting,

FIG. 9 is an exploded view of the mounting, and

In all figures, the same elements have the same reference numerals.

Figure 1:
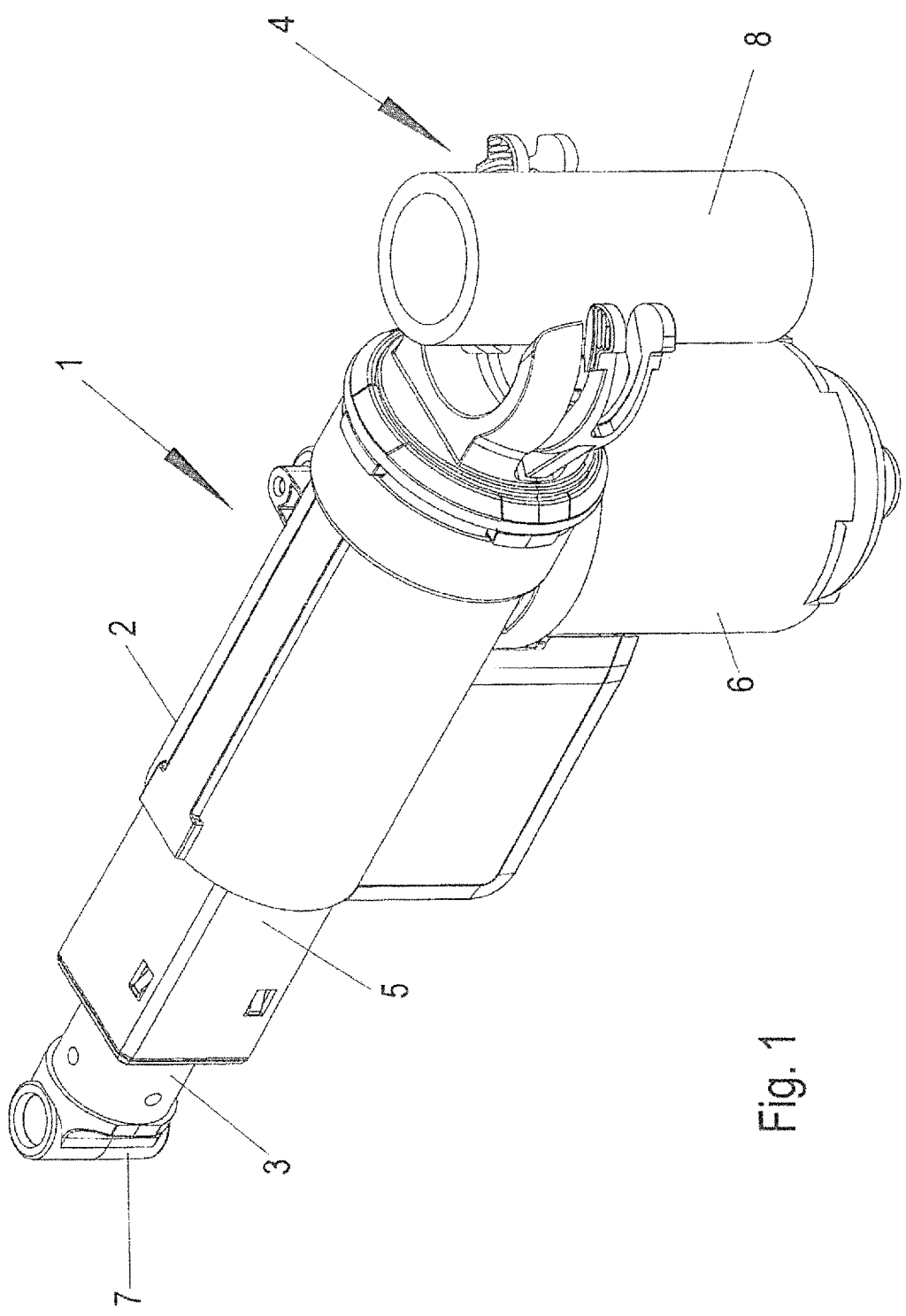
FIG. 1 is a perspective view of linear actuator.

FIG. 1 shows a linear actuator 1 comprising a console 2, a driven element 3 moveable at a front end of the console 2 and a mounting 4 at a rear end of the console 2.

The driven element 3 is a so-called "inner tube" which is telescoping inside an outer tube 5 connected to the console 2. An electric motor 6 is connected to the console 2 and drives a spindle which is arranged in the console 2 and the outer tube 5. The driven element 3 is connected to a spindle nut which is threaded on the spindle. The spindle nut is secured against rotation. When the electric motor 6 drives the spindle, the spindle nut and consequently the driven element 3 is driven out of or into the outer tube 5. The direction of movement of the driven element 3 depends on the direction of rotation of the electric motor 6.

The driven element 3 is connected to a front mounting 7 which can be used for connecting the driven element 3 to e.g. a section of a bed.

The mounting 4 at the rear end of the console 2, which is often referred to as "rear mounting", is used for connecting the linear actuator 1 to a shaft 8. The shaft 8 can be a part of a bed in which the linear actuator 1 is used. However, the shaft 8 can be part of any other item or article of furniture in which the linear actuator 1 is used.

The mounting 4 comprises two arms 9,10 defining an accommodating space 11 there between. The accommodating space 11 has an opening 18 extending between the free ends of the arms 9,10. In the present embodiment, each arm 9,10 is provided with a lever 12,13. The lever 12 is a two-arm lever, one end of which is an end portion 14 and the other end constitutes an actuation portion 15. The lever 12 is rotatable about an axis y located between the end portion 14 and the actuation portion 15 (see FIG. 9). It extends perpendicular to the plane of the drawing of FIGS. 2-4, or parallel to the longitudinal axis of the shaft 8.

In the same way, the lever 13 is a two-arm lever, one end of which is an end portion 16 and the other end constitutes an actuation portion 17.

Figure 2:
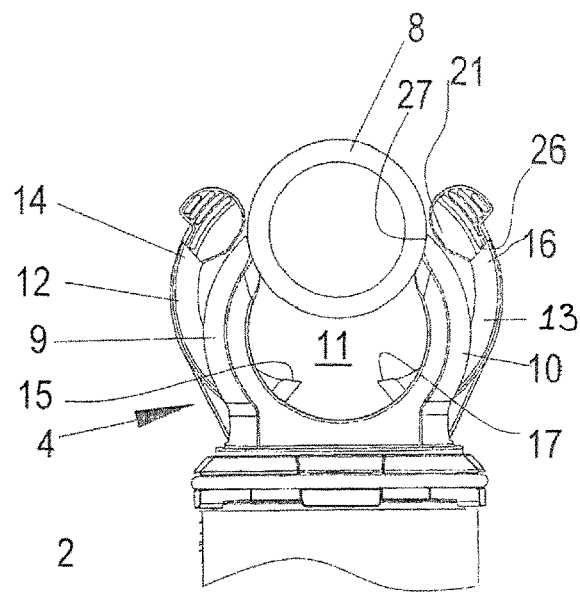
FIG. 2 is a top view of the linear actuator before insertion of a shaft.
Figure 3:
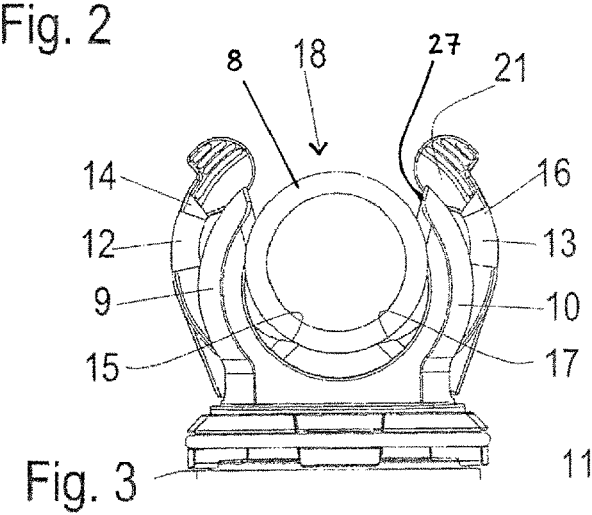
FIG. 3 is a top view of the linear actuator during insertion of a shaft.
Figure 4:
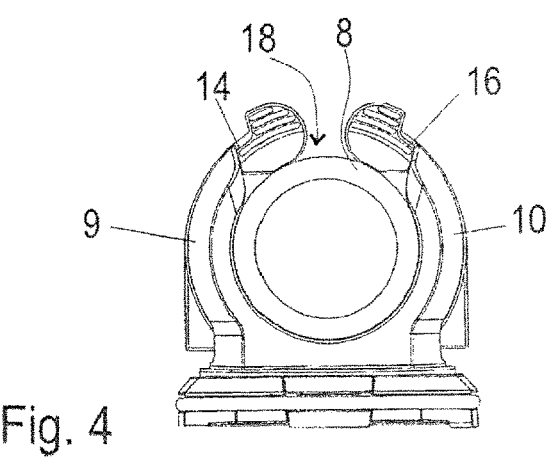
FIG. 4 is a top view of the actuator with inserted shaft.

When the levers 12,13 are in the position shown in FIG. 2, the two actuation portions 15,17 protrude into the accommodation space 11. This position is called "the open position" since the accommodation space 11 is open to the outside so that the shaft 8 can be inserted through the opening 18 (FIGS. 3 and 4). As can be seen in FIG. 2, the shaft 8 touches the free ends of the arms 9,10.

It should be mentioned, that the distance between the two arms 9,10 at the opening 18 is slightly smaller than the diameter of the shaft 8 so that the arms 9,10 flex slightly outwards or away from each other when the shaft 8 is inserted into the accommodation space 11.

When the shaft 8 is pushed further into the accommodation space 11, it comes into contact with the actuation portions 15,17 of the levers 12,13 (FIG. 3). Upon further movement of the shaft 8 into the accommodation space 11, the lever 12 is rotated clockwise and the lever 13 is rotated counter clockwise (with respect to the view shown in FIG. 3) and the two end portions 14,16 move towards each other reducing the opening 18 of the accommodation space 11 such that the shaft 8 cannot move out of the accommodation space 11.

In the closed position shown in FIG. 4, the levers 12,13 are secured by means of a snap connection. In the present embodiment, this is a releasable snap connection.

This connection will be described in connection with FIGS. 5 to 7.

Figure 5:
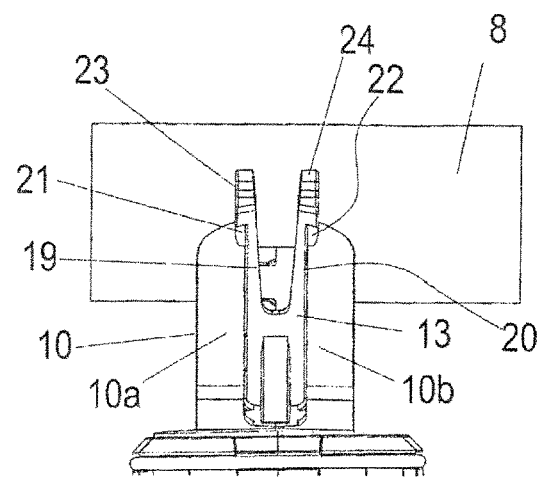
FIG. 5 is a side view of the actuator before insertion of the shaft.
Figure 6:
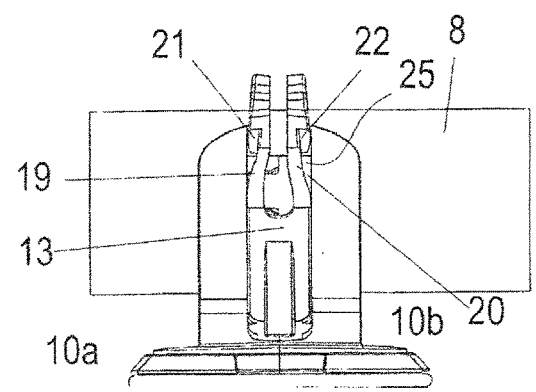
FIG. 6 is a side view of the actuator during insertion of the shaft.
Figure 7:
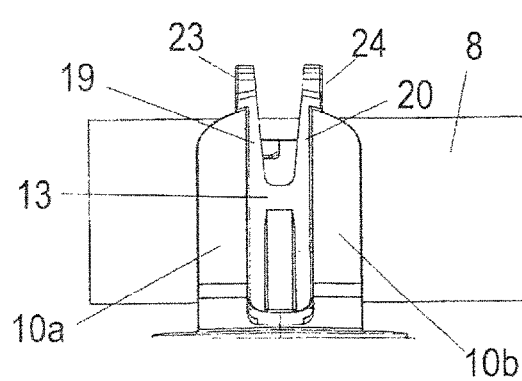
FIG. 7 is a side view of the linear actuator with inserted shaft.
Figure 10:
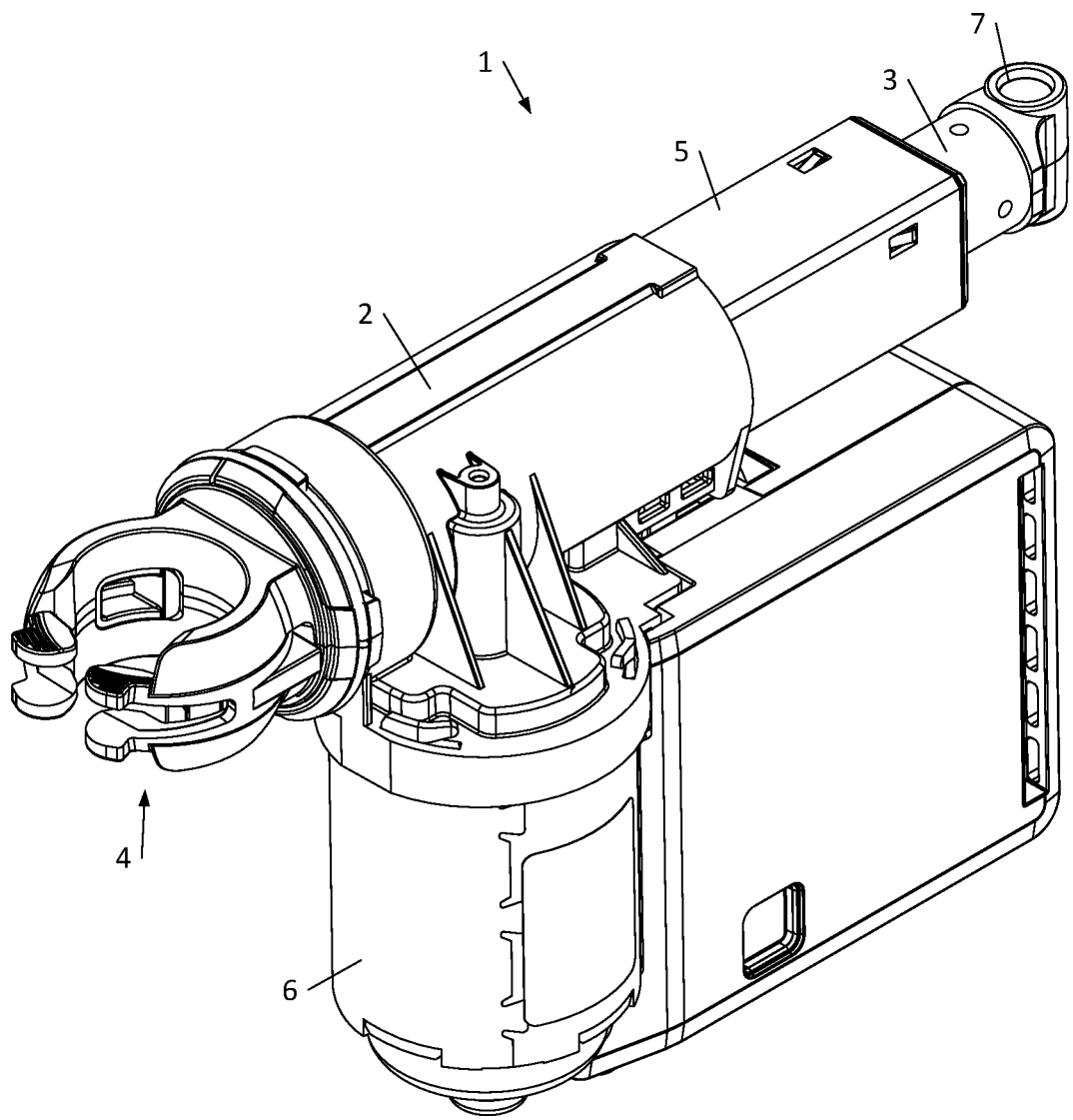
FIG. 10 is a perspective view of the linear actuator.

FIG. 5 shows a side view corresponding to the top view of FIG. 2, FIG. 6 shows a side view corresponding to the top view of FIG. 3, and FIG. 7 shows a side view corresponding to the top view of FIG. 4.

In FIGS. 5 to 7 the lever 13 of the arm 10 is shown. The lever 13 comprises two spring branches 19,20. Each spring branch 19,20 has a wedge 21,22. The arm 10 is made of two-arm parts 10a,10b. Each arm part 10a,10b is furnished with a stop 27 at the end adjacent to the opening 18. At the end of each spring branch 19,20, a grip 23,24 is arranged. The two spring branches 19,20 can be pressed together by using two fingers.

When the shaft 8 is pushed into the accommodation space 11 and the levers 12,13 are rotated to close or reduce the opening 18 of the accommodation space 11, the wedges 21,22 have to pass through a gap 25 between the two parts 10a,10b of the arm 10. During this movement, the two spring branches 19,20 are pressed together so that the wedges 21,22 can pass the two parts 10a,10b of the arm 10. When the shaft 8 has been completely inserted into the accommodation space 11 (FIG. 7) the spring arms 19,20 flex back into their initial position and the rear side 26 (FIG. 2) of the wedges 21,22 comes to rest behind a stop arrangement which is constituted by the two-part 10a,10b of the arm 10. Such a stop 27 of the stop arrangement is shown in FIGS. 2 and 3.

It is apparent that the levers 12,13 cannot be opened as long as the wedge 21, more precisely the rear side 26 of the wedge 21, rests against the stop 27. However, when the two grip portions 23,24 are pressed together, the rear side 26 of the wedges 21,22 will disengage from the stops 27, and the levers 12,13 can be turned or rotated in the open position shown in FIG. 2.

As can be seen in FIGS. 5-7 the lever 13 is arranged in the space between the two-part 10a,10b of the arm 10 in a direction parallel to the longitudinal axis of the inner and outer tube, 3,5. The spring branches 19,20 are located in the gap 25 of the lever 13 at least when the lever 13 is in the closed position. The embodiment of the lever 12, corresponds to the lever 13.

In the closed position shown in FIGS. 4 and 7, the actuation portion 15,17 of the levers 12,13 can extend slightly into the accommodation space 11 defined by the arms 9,10. The actuation portions 15,17 only extend a fraction of a millimeter (for example, 0,2, 0,3, 0,4, or 0.5 mm) into the accommodating space 11, and are therefore not visible in FIG. 4. However, in the closed position, the shaft 8 only contacts the actuating portions 15,17 of the levers and the remaining inner surface of the arms 9, 10. When the levers 12,13 are made from a material which has a lower friction coefficient to the shaft 8 than the material of the arms 9, 10, noise can be reduced or totally avoided when the whole linear actuator 1 rotates around the shaft or vice versa.

As can be seen in particular in FIG. 9, the mounting 4 comprises two housing parts. The two housing parts form the parts 9a,9b,10a,10b of the arms 9, 10. The levers 12,13 are mounted between the two housing parts.

The invention claimed is:

1. A linear actuator (1) comprising:
   an actuator housing (2);
   a driven element (3) movable at a front end of the linear actuator (1); and
   a mounting (4) at a rear end of the linear actuator (1), wherein the mounting (4) comprises:
      two arms (9,10); and
      an accommodation space (11) between the two arms (9,10) having an opening (18),
      wherein at least one arm (9,10) is provided with a lever (12,13), the lever (12,13) having an end portion (14, 16) at a first end distal to the actuator housing (2), and an actuation portion (15, 17) at a second end proximal to the actuator housing (2), the lever (12, 13) is configured to rotate relative to the at least one arm (9, 10) about an axis located between the end portion (14, 16) and the actuation portion (15, 17), wherein the lever (12, 13) is rotatable between an open position and a closed position, and wherein in the closed position, the end portion (14,16) of the lever (12,13) at least partly closes the opening (18) and in the open position makes the opening (18) accessible.

2. The linear actuator according to claim 1, wherein the lever (12,13) is a two-arm lever, wherein in the open position, the actuating portion (15,17) protrudes into the accommodation space (11).

3. The linear actuator according to claim 1, wherein the lever (12,13) is secured in the closed position by means of a snap connection.

4. The linear actuator according to claim 3, wherein the snap connection is a releasable snap connection.

5. The linear actuator according to claim 4, wherein the snap connection comprises a wedge arrangement (21,22) at the lever (12,13) and a stop arrangement (27) at the arm (9,10), wherein engagement of the wedge arrangement (21, 22) and the stop arrangement (27) prevents rotation of the lever (12,13) about the axis.

6. The linear actuator according to claim 5, wherein the wedge arrangement (21,22) and the stop arrangement (27) are movable relatively to each other in a direction perpendicular to the longitudinal axis of the inner tube (3).

7. The linear actuator according to claim 5, wherein the wedge arrangement (21,22) is located on a resilient part of the lever (12,13).

8. The linear actuator according to claim 5, wherein the wedge arrangement comprises at least two wedges (21,22), each wedge (21,22) being arranged on a resilient branch (19,20) of the lever (12,13), wherein the resilient branches (19,20) can be pressed towards each other to move the wedges (21,22) out of engagement with the stop arrangement (27).

9. The linear actuator according to claim 1, wherein the mounting (4) comprises a fixture housing, wherein the fixture housing comprises two housing parts and the lever (12,13) is mounted between the two housing parts.

10. The linear actuator according to claim 1, wherein each arm (9,10) comprises a lever (12,13).

11. The linear actuator according to claim 1, wherein in the closed position at least in a region of the accommodation space (11) opposite the opening (18), the lever (12,13) extends into the accommodation space (11) over the arm (9,10).

12. The linear actuator according to claim 11, wherein the lever (12,13) at least at a surface facing the accommodation space (11) is made of a material having a lower friction coefficient than the material of the arm (9,10).

13. The linear actuator according to claim 1, wherein the surface of the arm (9,10) facing the accommodating space (11) has a lower friction coefficient than the lever (12,13) at least on a surface facing the accommodation space (11).

* * * * *